United States Patent
Ryu et al.

(10) Patent No.: US 7,352,109 B2
(45) Date of Patent: Apr. 1, 2008

(54) FLAT TYPE PIEZOELECTRIC ULTRASONIC MOTOR

(75) Inventors: Jung Ho Ryu, Kyungki-do (KR); Dae Hyun Jeong, Kyungki-do (KR); Sung Won Min, Seoul (KR); Byung Woo Kang, Seoul (KR); Hyung Min Choi, Kyungki-do (KR); Burhanettin Koc, Kyungki-do (KR)

(73) Assignee: Samsung Electro-Mechanics Co., Ltd., Suwon, Kyungki-Do (KR)

( * ) Notice: Subject to any disclaimer, the term of this patent is extended or adjusted under 35 U.S.C. 154(b) by 402 days.

(21) Appl. No.: 11/082,004

(22) Filed: Mar. 16, 2005

(65) Prior Publication Data

US 2006/0108895 A1 May 25, 2006

(30) Foreign Application Priority Data

Nov. 24, 2004 (KR) ...................... 10-2004-0097004

(51) Int. Cl.
*H02N 2/00* (2006.01)

(52) U.S. Cl. .......................... 310/323.01; 310/323.03; 310/365

(58) Field of Classification Search ................ 310/323, 310/363–365, 367
See application file for complete search history.

(56) References Cited

U.S. PATENT DOCUMENTS 2,439,499 A * 4/1948 Williams et al. ............ 310/317
4,445,779 A * 5/1984 Johnson ...................... 356/459
7,015,623 B2 3/2006 Nitto

FOREIGN PATENT DOCUMENTS

| JP | 200448932 A | 2/2004 |
| JP | 2004-88815 | 3/2004 |

* cited by examiner

*Primary Examiner*—J. San Martin
(74) *Attorney, Agent, or Firm*—Volpe And Koenig P.C.

(57) ABSTRACT

There is provided a flat type piezoelectric ultrasonic motor for generating a rotation force to a rotor by ultrasonic vibrations. In the piezoelectric ultrasonic motor, a vibrator is formed of elastic material at a given size, a plurality of piezoelectric plates are attached on the vibrator, a rotor is drivingly connected to the vibrator thereby to be rotated, and a power source unit applies driving voltages to the piezoelectric plates. The piezoelectric plates are arranged on quartered surface areas of the vibrator in such a way that longitudinal axes of neighboring piezoelectric plates form a given angle therebetween and opposing piezoelectric plates have opposite polarizations, and the power source unit applies alternating driving voltages to the piezoelectric plates thereby to make the rotor rotated, thereby making it possible to simplify the piezoelectric plates' shape, minimize its size and enhance its driving efficiency.

20 Claims, 14 Drawing Sheets

FLAT TYPE PIEZOELECTRIC ULTRASONIC MOTOR

RELATED APPLICATION

The present application is based on, and claims priority from, Korean Application Number 2004-97004, filed Nov. 24, 2004, the disclosure of which is hereby incorporated by reference herein in its entirety.

BACKGROUND OF THE INVENTION

1. Field of the Invention

The present invention relates to a flat type piezoelectric ultrasonic motor for generating a rotation force to a rotor by an ultrasonic vibration, and more particularly, to a flat type piezoelectric ultrasonic motor equipped with a rotor, a vibrator and piezoelectric plates respectively arranged on quartered surface areas of the vibrator, and driven in such a way that the rotor is rotated by the vibrator vibrated by different-phased alternating currents applied to the quartered surface areas, thereby making it possible to simplify the piezoelectric plates' shape, minimize its size and enhance its driving efficiency.

2. Description of the Related Art

In general, a conventional piezoelectric ultrasonic motor is also called a traveling-wave type motor, a surface-wave type motor or a surfing type motor, and is driven by superposing two different-phased standing waves.

FIG. 1 illustrates a structure of such a conventional piezoelectric ultrasonic motor.

Referring to FIG. 1, a piezoelectric ultrasonic motor 200 is constructed in such a way that a plurality of piezoelectric plates 220 are arranged in a ring type on a lower surface of a ring type rotor 210 as shown in FIG. 1(A), or that a plurality of piezoelectric plates 240 are arranged in a ring type on an inner surface of a ring type rotor 230 as shown in FIG. 1(B).

As shown in FIG. 1(C), the piezoelectric ultrasonic motor 200 is operated in such a way to alternately induce polarizations in a plurality of electrodes of the ring type piezoelectric plates 220 and then apply different-phased resonant-frequency voltages to the electrodes thereby to generate elliptical-locus traveling waves on surfaces of the ring type piezoelectric plates 220.

However, it is difficult to manufacture the ring type piezoelectric plates 220 and to induce a plurality of polarizations in the ring type piezoelectric plates 220.

Also, stresses are concentrated on boundary surfaces between the electrodes of the ring type piezoelectric plates 220 during the operation of the motor 200, whereby such a stress concentration incurs cracks and breaks in the plates 220.

Moreover, it is difficult to miniaturize the motor 200 because the plates 220 have a plurality of electrodes and polarizations.

In the meantime, a conventional ultrasonic motor device generating linear motion by ultrasonic vibrations is disclosed in Japan Patent No. JP2004-088815.

FIG. 2 illustrates a structure of such a conventional ultrasonic motor device operated in such a way that a control range of a driving speed is expanded in a low-speed range.

Referring to FIG. 2, an ultrasonic motor device 300 is constructed to include a motor 310A having a vibrator 311 and a moving unit 312, power sources 316A and 316B, a phase controller 317 for diverting phases of driving voltages outputted from the power sources 316A and 316B, and a preloader 318 for supporting the vibrator 311 and pressing the moving unit 312 with a given force.

In the ultrasonic motor device 300, upper piezoelectric elements 314A and 314B are attached on the upper surface of the vibrator 311 with their longitudinal axes being aligned, and lower piezoelectric elements 314C and 315D are attached on the lower surface of the vibrator 311 with their longitudinal axes being aligned in parallel to those of the upper piezoelectric elements 314A and 314B. A driving voltage from the power source 316A is applied to the diagonally-opposed elements 314B and 314C and another driving voltage from the power source 316B is applied to the diagonally-opposed elements 314A and 314D, whereby the vibrator 311 is vibrated and thereby the moving unit 312 drivingly connected to the vibrator 311 is linearly moved.

Also, a moving speed of the moving unit 312 can be changed by a phase change of the driving voltages, or by a load change of the preloader 318.

However, the moving unit 312 can be moved only linearly, but not rotatively.

SUMMARY OF THE INVENTION

Accordingly, the present invention has been devised to solve the aforementioned problems.

An object of the present invention is to provide a flat type piezoelectric ultrasonic motor that can rotate its rotor and also facilitate miniaturization of its size and enhance its driving efficiency.

Another object of the present invention is to provide a flat type piezoelectric ultrasonic motor that makes it possible to facilitate its production and assembly and to smoothly drive its rotor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a flat type piezoelectric ultrasonic motor for generating a rotation force to a rotor by ultrasonic vibrations includes: a vibrator formed of elastic material; a plurality of piezoelectric plates attached on the vibrator; a rotor drivingly connected to the vibrator to be rotated thereby; and a power source unit for applying driving voltages to the piezoelectric plates; the piezoelectric plates being arranged on quartered surface areas of the vibrator in such a way that longitudinal axes of neighboring piezoelectric plates form a given angle therebetween and opposing piezoelectric plates have opposite polarizations; the power source unit applying alternating driving voltages to the piezoelectric plates thereby to make the rotor rotated.

In another aspect of the present invention, a flat type piezoelectric ultrasonic motor for generating a rotation force to a rotor by ultrasonic vibrations includes: a vibrator formed of elastic material; a plurality of piezoelectric plates attached on the vibrator; a rotor drivingly connected to the vibrator to be rotated thereby; a preloader for bringing the rotor into contact with the vibrator; and a power source unit for applying driving voltages to the piezoelectric plates; the piezoelectric plates being arranged on quartered surface areas of the vibrator in such a way that longitudinal axes of neighboring piezoelectric plates form a given angle therebetween and opposing piezoelectric plates have opposite polarizations; the power source unit applying alternating driving voltages to the piezoelectric plates thereby to make the rotor rotated.

Preferably, the alternating driving voltages are different from each other in their phase by 90°.

Preferably, the given angle is 75° through 105°.

More preferably, the given angle is 90°.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 are views illustrating a structure of a conventional ultrasonic motor, in which

FIG. 3 are views illustrating a structure of a flat type piezoelectric ultrasonic motor according to the present invention, in which

FIG. 4 are views illustrating an arrangement structure of a piezoelectric plate in a flat type piezoelectric ultrasonic motor according to the present invention, in which

FIG. 5 are views illustrating an operation of a flat type piezoelectric ultrasonic motor according to the present invention, in which

FIG. 7 are graphs illustrating various operation modes of a flat type piezoelectric ultrasonic motor of the present invention according to a finite element analysis, in which

FIG. 10 are views illustrating examples of testing a performance of a flat type piezoelectric ultrasonic motor according to the present invention, in which FIG. 11 are exemplary views illustrating possible structures of a flat type piezoelectric ultrasonic motor according to the present invention, in which

DETAILED DESCRIPTION OF THE INVENTION

Reference will now be made in detail to the preferred embodiments of the present invention, examples of which are illustrated in the accompanying drawings.

Figure 1A:
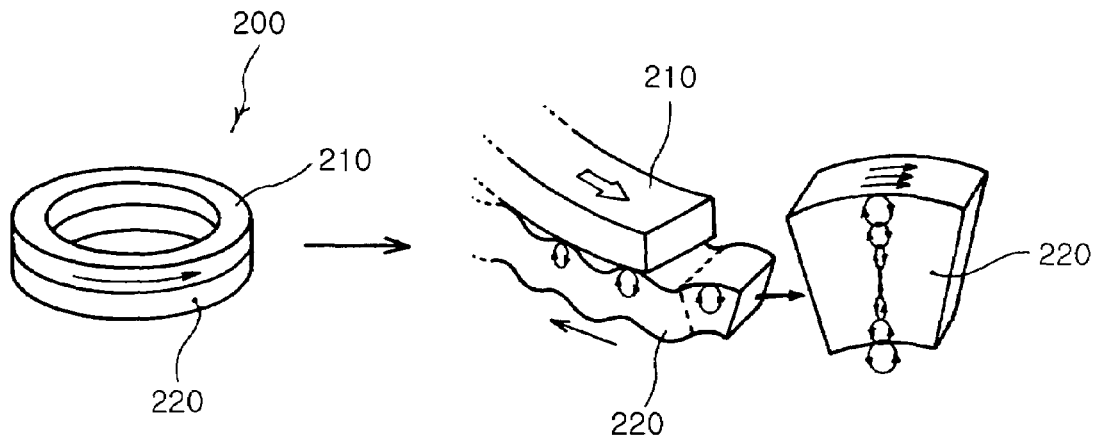
FIG. 1(A) is a view illustrating a structure where a rotor is rotated on a ring-type piezoelectric plate.
Figure 1B:
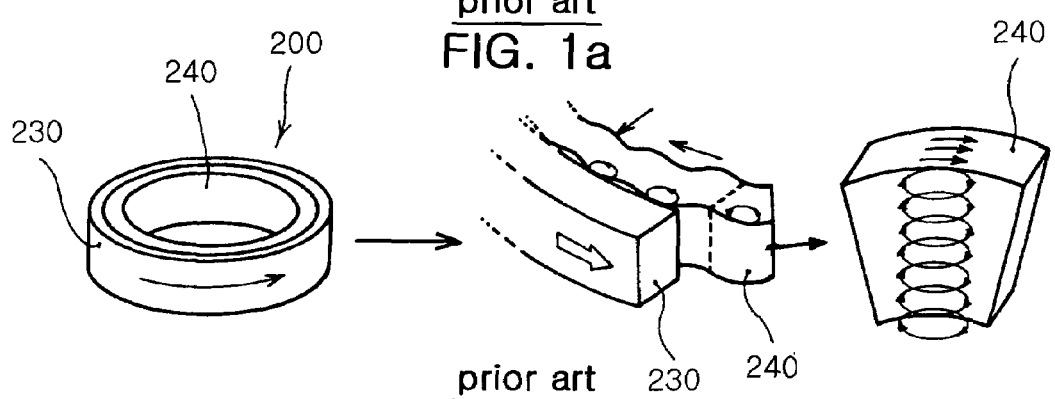
FIG. 1(B) is a view illustrating a structure where a rotor is rotated in an outside of the ring-type piezoelectric plate.
Figure 1C:
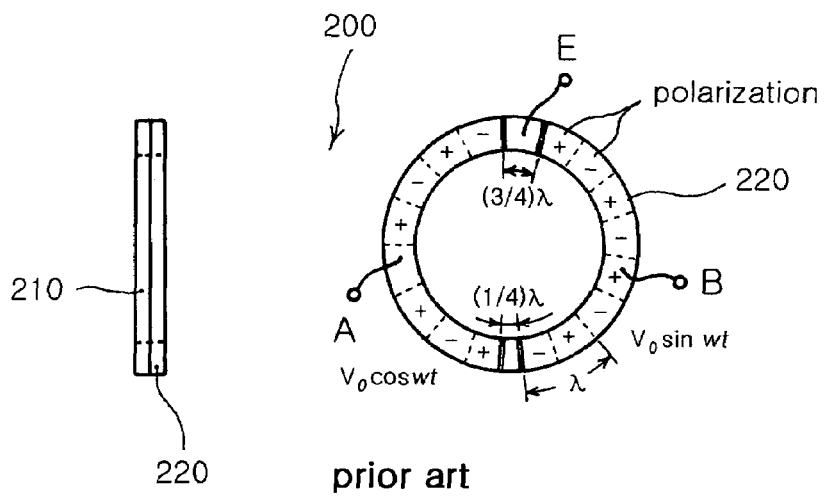
FIG. 1(C) is a view illustrating a state where a polarization is formed on the ring-type piezoelectric plate.
Figure 2:
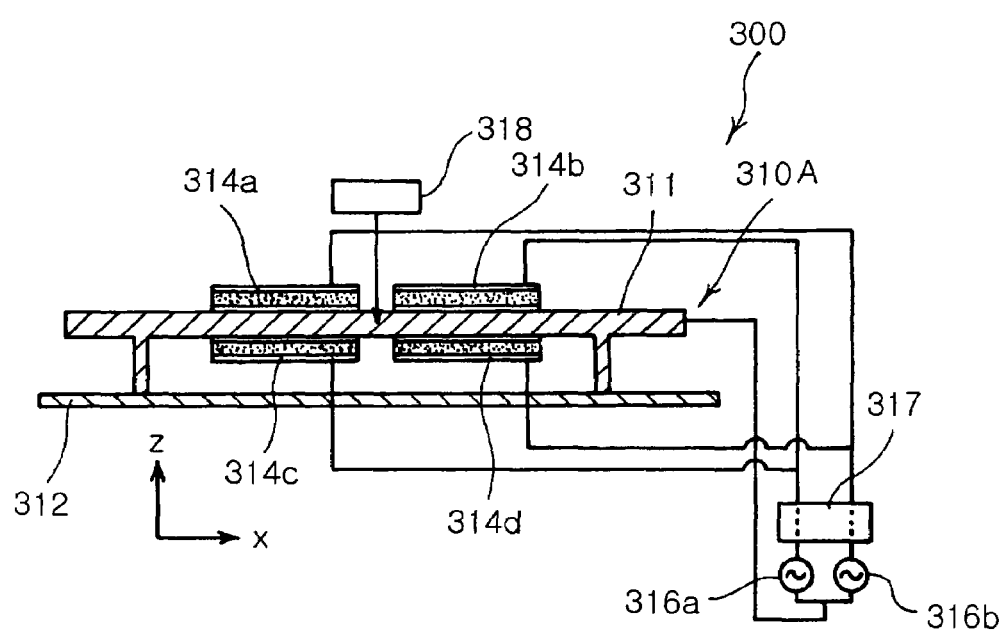
FIG. 2 is a view illustrating a structure of a conventional linear ultrasonic motor.
Figure 3A:
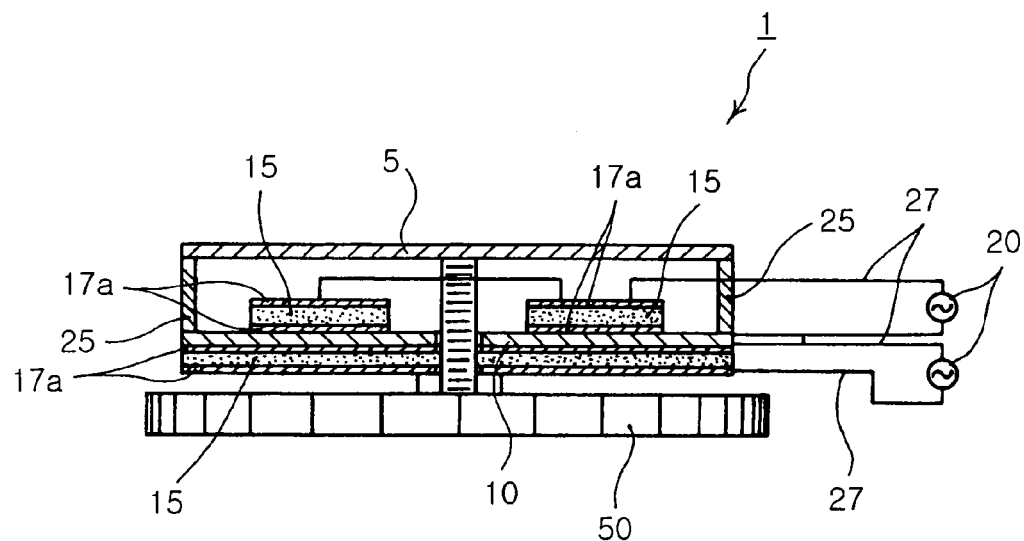
FIG. 3(A) is a view illustrating a structure of a flat type piezoelectric ultrasonic motor according to an embodiment of the present invention.
Figure 3B:
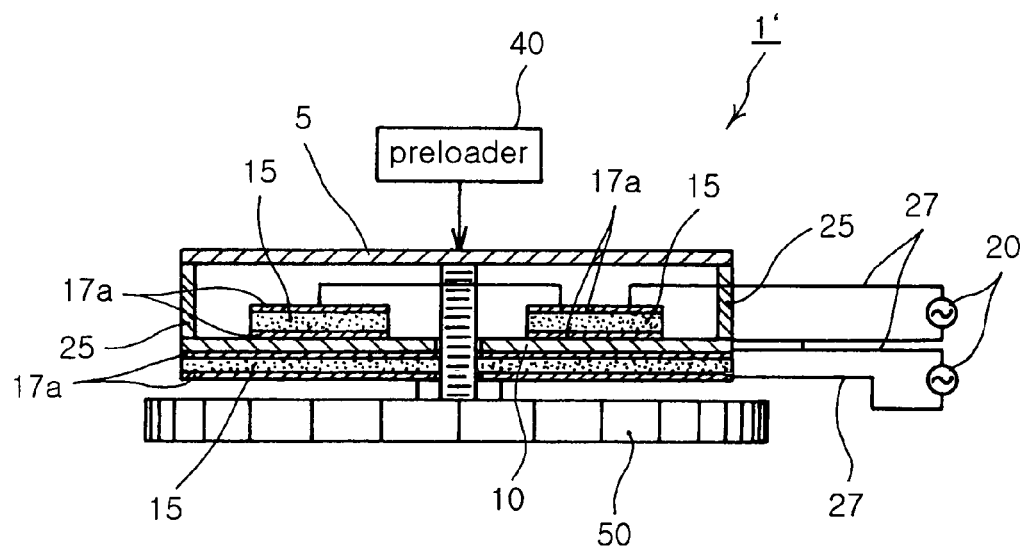
FIG. 3(B) is a view illustrating a structure of a flat type piezoelectric ultrasonic motor with a preloader according to a second embodiment of the present invention.

FIG. 3 illustrates a structure of a flat type piezoelectric ultrasonic motor according to the present invention. In detail, FIG. 3(A) illustrates a structure of a flat type piezoelectric ultrasonic motor according to an embodiment of the present invention, and FIG. 3(B) illustrates a structure of a flat type piezoelectric ultrasonic motor with a preloader according to a second embodiment of the present invention.

Referring to FIG. 3(A), a flat type piezoelectric ultrasonic motor 1 generates a rotation force to a rotor 5 by using ultrasonic vibrations.

In the flat type piezoelectric ultrasonic motor 1, a vibrator 10 is formed of elastic material at a given size.

Here, the vibrator 10 may be formed of metal or ceramics so as to maintain an elastic force.

Figure 4A:
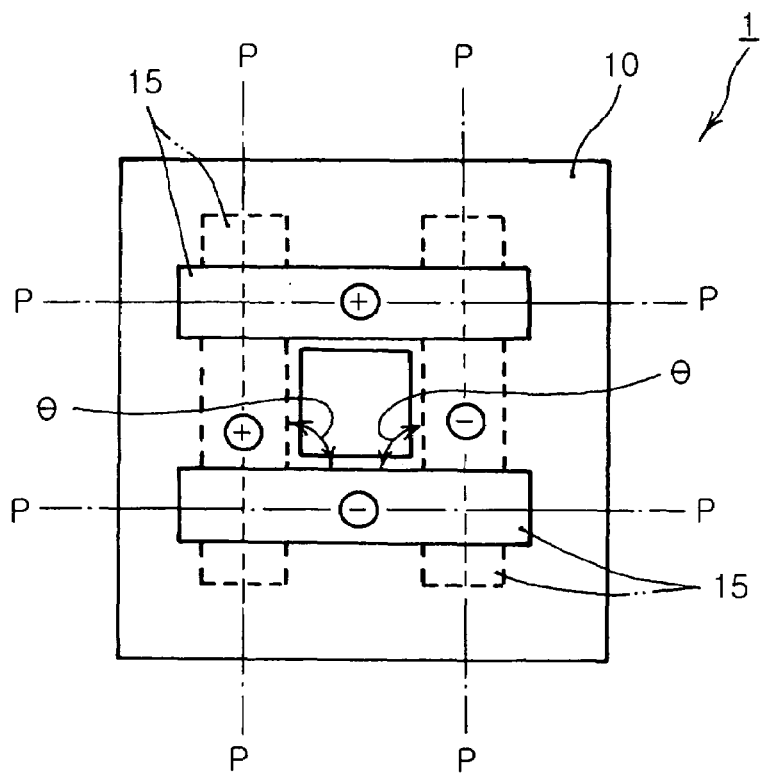
FIG. 4(A) is a view illustrating a state where piezoelectric plates are arranged on a vibrator.

A plurality of piezoelectric plates 15 are attached on a surface of the vibrator 10 by using a resin adhesive (not shown). Here, the piezoelectric plates 15 are arranged on quartered surface areas of the vibrator 10 in such a way that longitudinal axes P of neighboring piezoelectric plates form a given angle G therebetween as shown in FIG. 4(A).

Electrodes 17A are formed on upper/lower surfaces of the piezoelectric plates 15, and a power source unit 20 (will be described later) supplies alternating voltages of different polarities respectively to the electrodes 17A.

Here, if the vibrator 10 is formed of a conductive metal plate, voltages can be provided through the vibrator 10 to electrodes 17A formed on piezoelectric plates 15 and contacting with the vibrator 10. Otherwise, if the vibrator 10 is formed of ceramics series, separate electrodes 17A formed of separate conductive metal films are formed on surfaces contacting with the vibrator 10.

Here, the piezoelectric plates may be made by piezoelectric ceramics of $Pb(ZrTi)O_3$ series having a high mechanical quality factor.

Figure 4B:
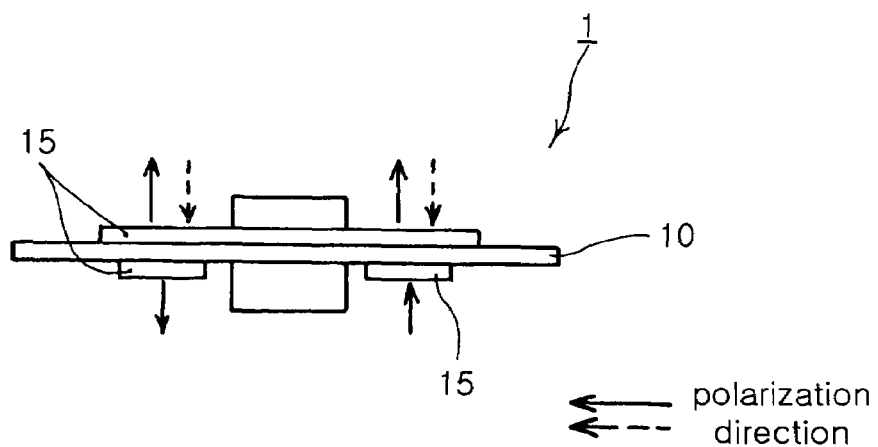
FIG. 4(B) is a side sectional view illustrating an arrangement structure of piezoelectric plates on a vibrator.

As shown in FIGS. 4(A) and 4(B), two upper piezoelectric plates 15 are arranged in parallel on an upper surface of the vibrator 10, and another two lower piezoelectric plates 15 intersecting the two upper piezoelectric plates 15 are arranged in parallel on a lower surface of the vibrator 10 in such a way that opposing piezoelectric plates have opposite polarizations. That is, the polarization of one of the two upper piezoelectric plates 15 is directed upward, and the polarization of the other of the two upper piezoelectric plates 15 is directed downward. Similarly, the polarization of one of the two lower piezoelectric plates 15 is directed upward, and the polarization of the other of the two lower piezoelectric plates 15 is directed downward.

A rotor 5 is drivingly connected to the vibrator 10 to be rotated thereby. As show in FIG. 3(A), the rotor 5 is connected to a plurality of legs 25 extended from the vibrator 10. When the vibrator 10 is vibrated by the piezoelectric plates 15 thereby to generate traveling waves, the legs 25 transmit the traveling waves to the rotor 5 with amplitudes of the waves being amplified by the extended length.

The electrodes 17A of the piezoelectric plates 15 are electrically connected through wires 27 to the power source unit 20. The power source unit 20 applies alternating driving voltages, which are different from each other in their phase by 90°, respectively to neighboring piezoelectric plates 15.

Although the power source unit 20 is illustrated to include a plurality of power sources supplying a plurality of driving voltages in FIG. 3(A), it is not limited to such a construction. For example, the power source unit 20 may be constructed to include a separate phase controller (not shown) for changing phases of driving voltages.

Figure 5A:
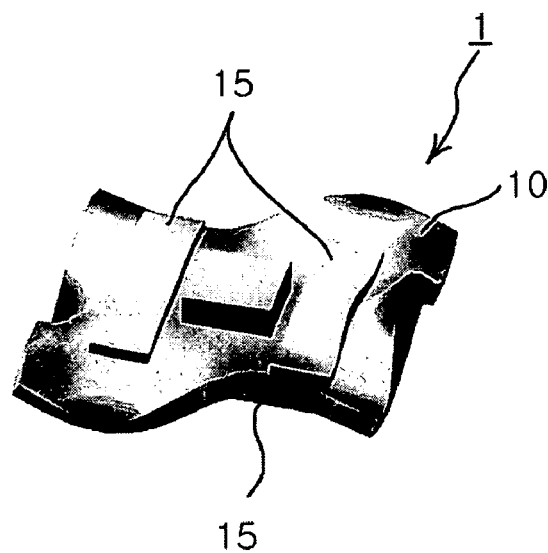
FIG. 5(A) is a view illustrating a state where a vibrator is deformed by piezoelectric plates.

When driving voltages are applied as above, the piezoelectric plates 15 are vibrated to generate sine waves and cosine waves whereby traveling waves are generated in the vibrator 10 as shown in FIG. 5(A). The generated traveling waves are transmitted through the legs 25 to the rotor 5 thereby to make the rotor 5 be rotated.

Figure 5B:
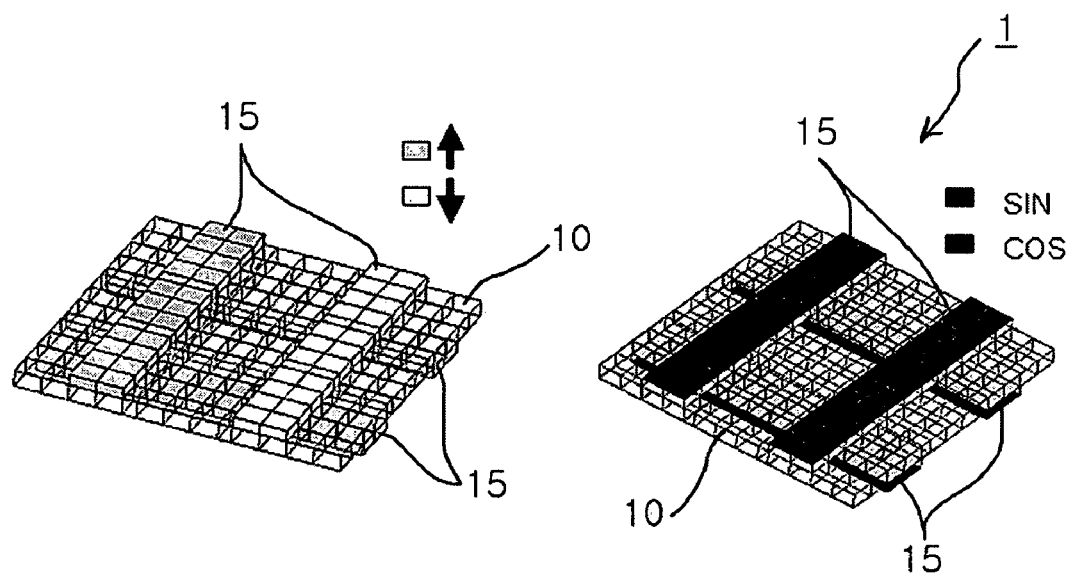
FIG. 5(B) is a view illustrating a direction of polarization applied to piezoelectric plates and a phase change of 90°.

At this time, two piezoelectric plates 15 on an upper surface of the vibrator 10 have different polarization directions as shown in FIG. 5(B). That is, the polarization of a left piezoelectric plate 15 on the upper surface is directed upward, and the polarization of a right piezoelectric plate 15 on the upper surface is directed downward. Also, two piezoelectric plates 15 on a lower surface of the vibrator 10 have different polarization directions. That is, the polarization of a front piezoelectric plate 15 on the lower surface is directed upward, and the polarization of a rear piezoelectric plate 15 on the lower surface is directed downward. The upper two piezoelectric plates 15 are vibrated to generate sine waves and the two lower piezoelectric plates 15 are vibrated to generate cosine waves, whereby traveling waves are generated in the vibrator 10.

In the meantime, when the driving voltages are applied to the upper and lower piezoelectric plates 15 in a changed order, the directions of the traveling waves generated in the vibrator 10 are changed whereby the rotor 5 is rotated in an opposite direction.

Various operation modes of the flat type piezoelectric ultrasonic motor 1 will now be described in detail with reference to FIG. 6.

Figure 6:
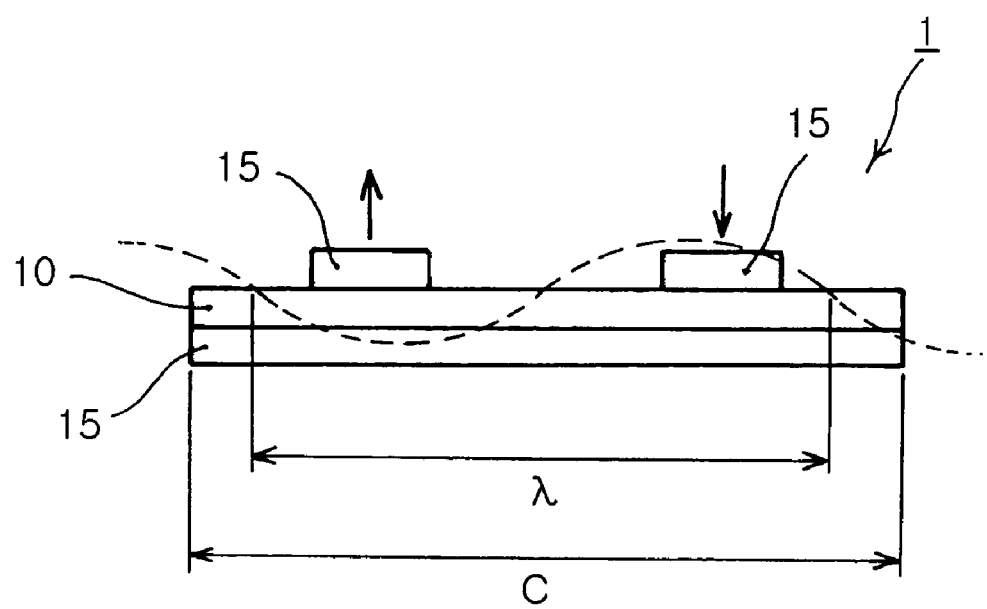
FIG. 6 is an exemplary view illustrating an operation principle of a flat type piezoelectric ultrasonic motor according to the present invention.

In FIG. 6, when considering only piezoelectric plates 15 on a rectangular elastic vibrator 10, since the plates 15 have opposite polarization directions, traveling waves can be generated when the plates 15 are all excited by harmonic signals through mechanical resonance with the vibrator 10. In all cases, the vibrator 10 and the plates 15 have a resonance mode due to vibration characteristics, and a frequency of the resonance mode is determined according to their thickness, length, width and elastic modulus, and the like.

In order to efficiently induce a useful traveling wave of a desired wavelength, an interval between the piezoelectric plates 15 should be properly set. Also, since lower piezoelectric plates 15 of the vibrator 10' are arranged in a structure the same as upper piezoelectric plates 15 of the vibrator 10', the same mechanical resonance can be generated at the same frequency.

If the lower piezoelectric plates 15 are not excited, the displacement $U_a$ of the vibrator 10' caused by the excitation of the upper piezoelectric plates 15 can be expressed by Equation 1 below:

$$U_a = A \cos(\omega t + \theta) \qquad \text{Equation 1,}$$

where 'A' is a constant, 'ω' is a frequency, 't' is time, and 'θ' is an initial phase angle.

If the upper piezoelectric plates 15 are not excited and the upper piezoelectric plates 15 are excited in the same harmonic signal by a driving voltage different by 90° from a driving voltage applied to the upper piezoelectric plates 15, the displacement $U_b$ of the vibrator 10' caused by the excitation of the lower piezoelectric plates 15 can be expressed by Equation 2 below:

$$U_b = A \sin(\omega t + \theta) \qquad \text{Equation 2}$$

Accordingly, if the upper and lower piezoelectric plates 15 are all excited, the total vibration of the vibrator 10 is a combination of $U_a$ and $U_b$. At some parts of the vibrator 10' distinguishable by the finite element analysis (FEA), the vibrator 10 generates elliptical motion shown in FIGS. 7(A) through 7(B). This elliptical motion is isolated and amplified by the legs 25, and then transmitted to the rotor 5 whereby the rotor 5 is rotated.

FIG. 7 are graphs illustrating various operation modes 2o of a flat type piezoelectric ultrasonic motor of the present invention.

Figure 7A:
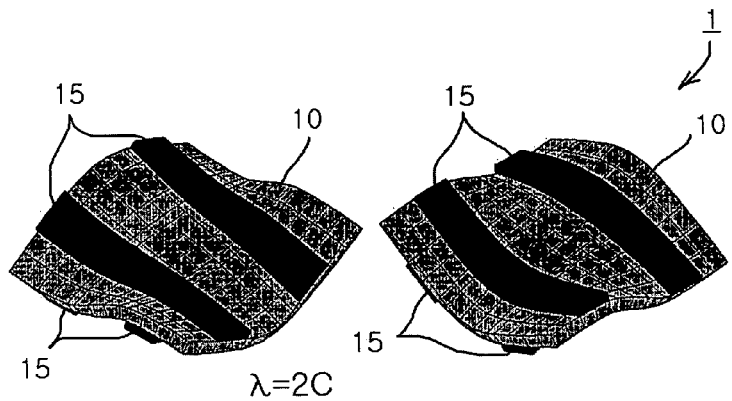
FIG. 7(A) is a graph illustrating a state where a vibrator is transformed with a relation of $\lambda=2c$ due to application of orthogonal vibrations on the vibrator.

In FIG. 7, FIG. 7(A) illustrates a state where the vibrator 10 is transformed with a relation of λ=2c due to application of two orthogonal vibrations thereon.

Figure 7B:
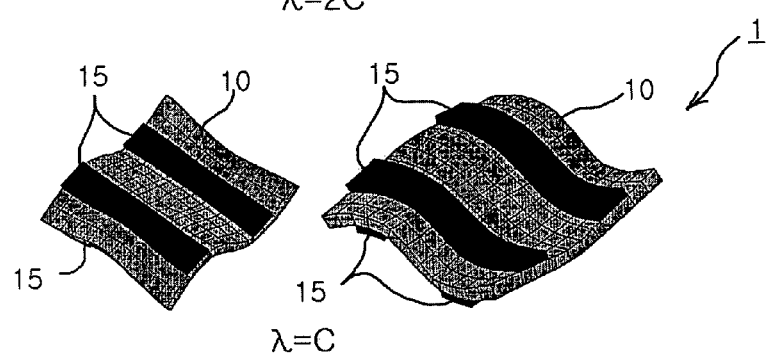
FIG. 7(B) is a graph illustrating a state where a vibrator is transformed with a relation of $\lambda=c$ due to application of orthogonal vibrations on the vibrator.

FIG. 7(B) illustrates a state where the vibrator 10 is transformed with a relation of λ=c due to application of tow orthogonal vibrations thereon.

Figure 7C:
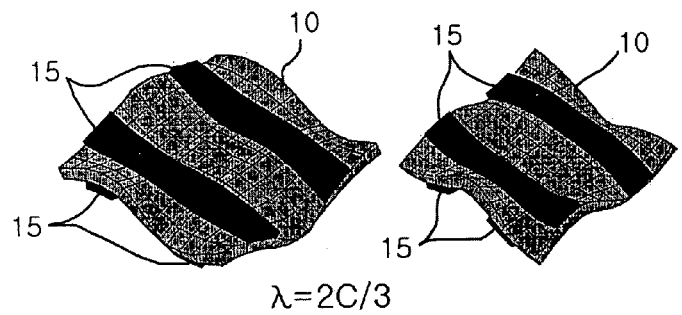
FIG. 7(C) is a graph illustrating a state where a vibrator is transformed with a relation of $\lambda=2c/3$ due to application of orthogonal vibrations on the vibrator.

FIG. 7(C) illustrates a state where the vibrator 10 is transformed with a relation of λ=2c/3 due to application of two orthogonal vibrations thereon.

Figure 7D:
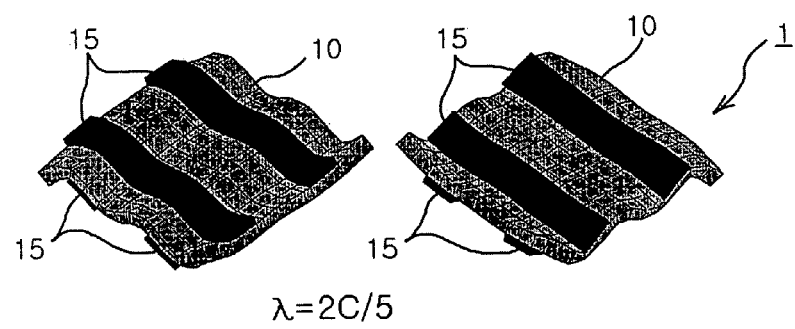
FIG. 7(D) is a graph illustrating a state where a vibrator is transformed with a relation of $\lambda=2c/5$ due to application of orthogonal vibrations on the vibrator.

FIG. 7(D) illustrates a state where the vibrator 10 is transformed with a relation of λ=2c/5 due to application of two orthogonal vibrations thereon.

Here, 'λ' is a wavelength of a traveling wave generated by the vibrator 10, and 'c' is the side length of the vibrator 10 (See FIG. 6).

As described previously, the present invention attaches the piezoelectric plates 15 on the quartered surfaces of the vibrator 10, and can rotate the rotor 5 by merely applying driving voltages to the attached plates 15. Accordingly, the present invention can minimize the motor's size and enhance the motor's driving efficiency Also, the present invention provides a second embodiment below so as to increase the rotor's impetus and driving speed.

A flat type piezoelectric ultrasonic motor 1' according to the second embodiment further includes a preloader 40 for increasing a contact force between the rotor 5 and the vibrator 10 as shown in FIG. 3(B).

In the first and second embodiments, the same reference signs are used to refer to the same parts.

Figure 8:
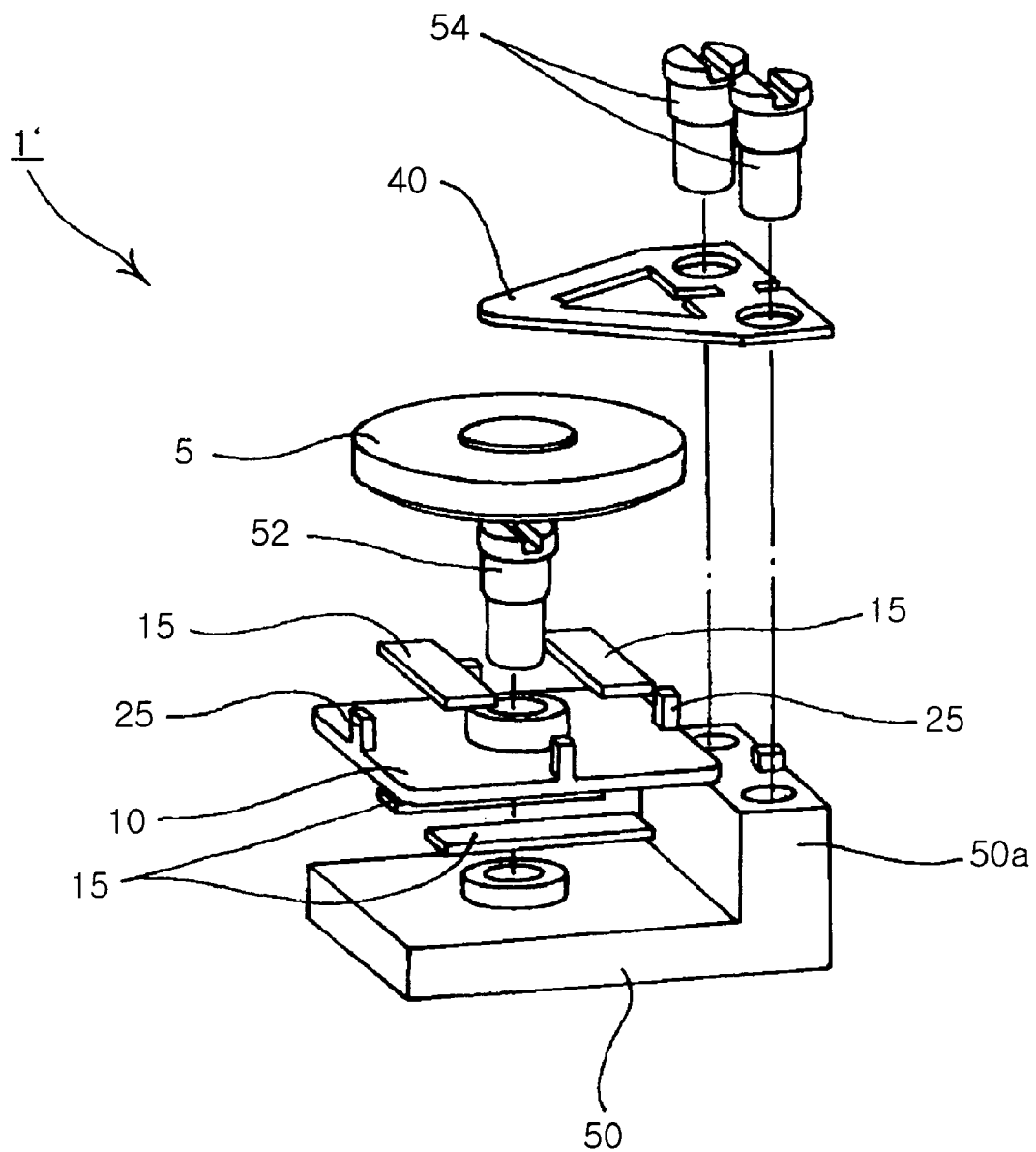
FIG. 8 is an exploded perspective view of a flat type piezoelectric ultrasonic motor according to a second embodiment of the present invention.
Figure 9:
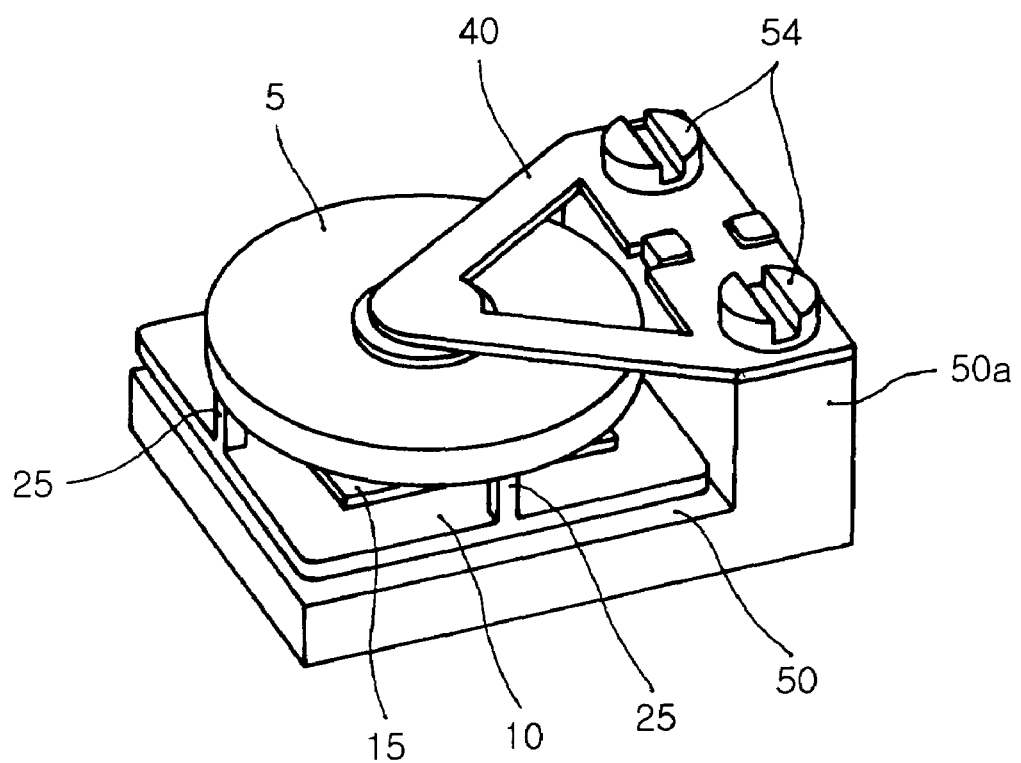
FIG. 9 is a perspective view illustrating an assembled state of a flat type piezoelectric ultrasonic motor according to a second embodiment of the present invention.

FIG. 8 is an exploded perspective view of the flat type piezoelectric ultrasonic motor 1' according to the second embodiment of the present invention, and FIG. 9 is a perspective view illustrating an assembled state of a flat type piezoelectric ultrasonic motor according to the second embodiment of the present invention.

Referring to FIGS. 8 and 9, in the flat type piezoelectric ultrasonic motor 1', a vibrator 10 having a plurality of piezoelectric plates 15 attached thereon is arranged over a base 50 of a given size, and a rotation axis 52 is inserted into a center hole of the vibrator 10.

In detail, a bottom end of the rotation axis 52 is fixed to the base 50, and a center part of the rotation axis 52 is inserted into the center hole of the vibrator 10. The piezoelectric plates 15 are arranged on quartered surface areas of the vibrator 10 in such a way that longitudinal axes P of neighboring piezoelectric plates form a given angle θ therebetween and opposing piezoelectric plates have opposite polarizations as shown in FIG. 4(A).

A rotor 5 is arranged over the vibrator 10, and drivingly connected to the vibrator 10 through legs 25 extended from vibrator 10. Also, a lower center surface of the rotor 5 is rotatably supported by a top end of the rotation axis 52.

Also, a lower surface of the rotor 5 is contacted with top ends of the legs 25. In this structure, a preloader 40 is arranged on an upper surface of the rotor 5 thereby to bring the rotor 5 into contact with the vibrator 10. Here, the preloader 40 may be a leaf spring.

Here, one end of the leaf spring is fixed to an upper step 50A of the base 50 with a bolt. Also, the other end of the leaf spring downwardly and elastically supports an upper center surface of the rotor 5 thereby to make a lower center surface of the rotor 5 rotatably supported by the top end of the rotation axis 52 and to bring a lower surface of the rotor 5 into close contact with the top end of the legs 25.

Also, the preloader 40 can be a coil spring having the same function as the leaf spring.

Also, a power source unit 20 applies alternating driving voltages, which are different from each other in their phase by 90°, respectively to the piezoelectric plates 15.

In this manner, the second embodiment of the present invention attaches the piezoelectric plates 15 on the quartered surfaces of the vibrator 10 in such a way that the plates 15 forms a rectangular shape, and can rotate the rotor 5 by merely applying driving voltages to the attached plates 15. Accordingly, the second embodiment makes it possible to minimize the motor's size and enhance the motor's driving efficiency. Also, the second embodiment makes it possible to enhance a contact state and force between the rotor 5 and the legs 25 and thereby efficiently transmit the traveling waves of the vibrator 10 to the rotor 5.

In the meantime, the present invention provides the piezoelectric ultrasonic motors 1 and 1' according to the first and second embodiments in which the angle θ between the neighboring piezoelectric plates 15 is 75° through 105°.

Figure 10A:
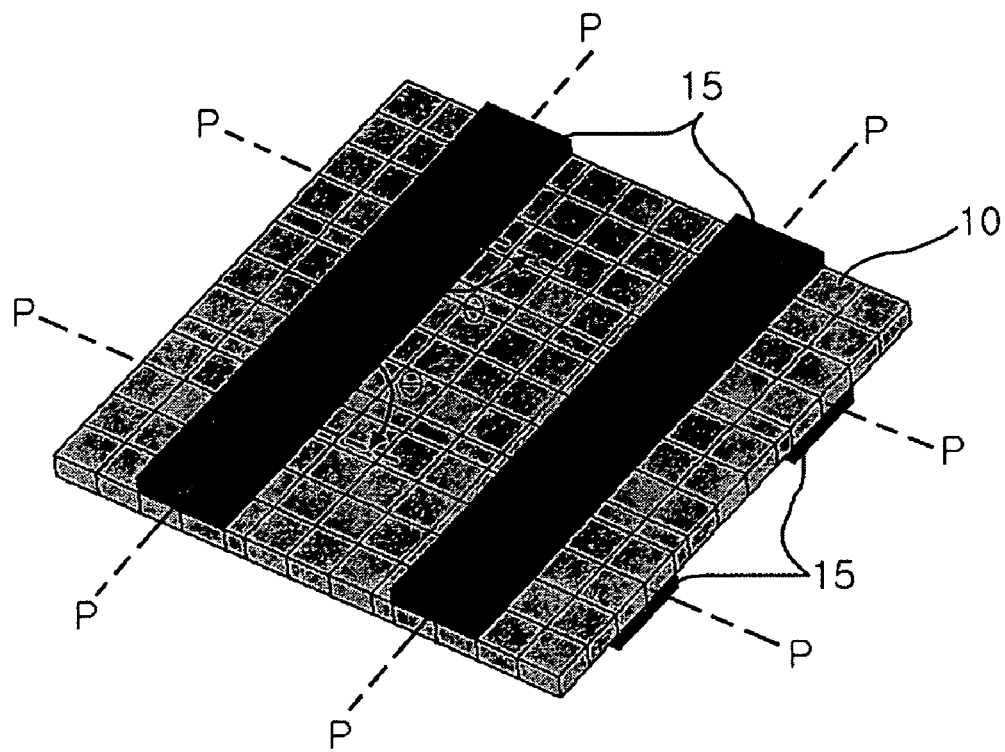
FIG. 10(A) is a view illustrating a test example where upper and lower surfaces of a vibrator each have two piezoelectric plates attached thereon and an angle between longitudinal axes of neighboring piezoelectric plates is 90°.
Figure 10B:
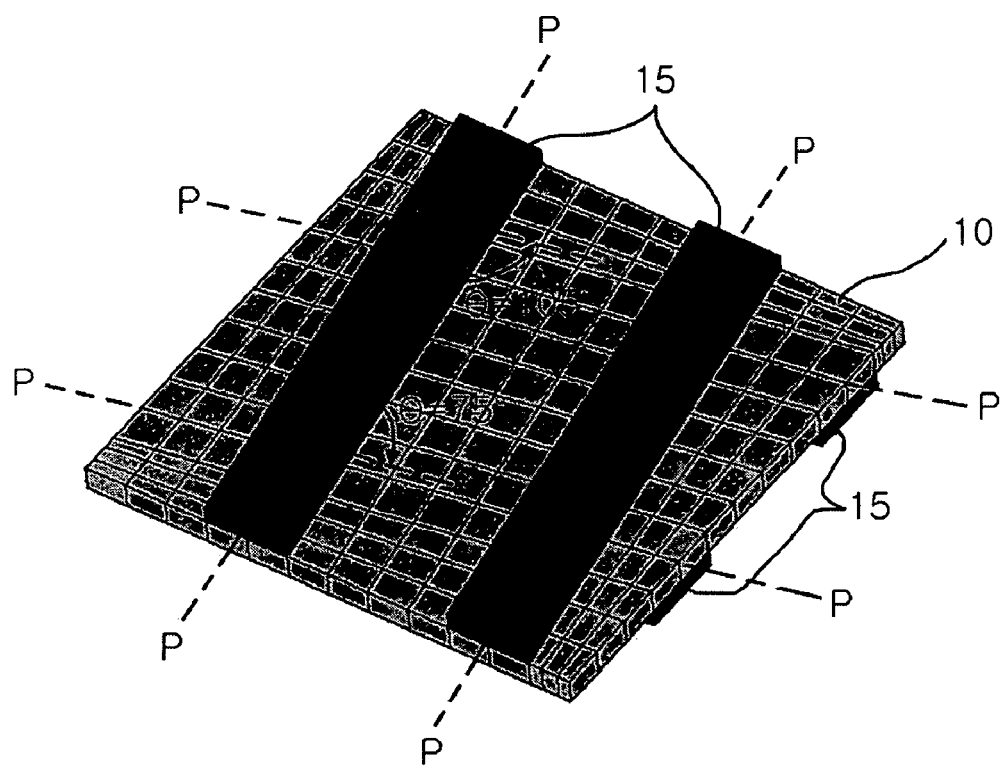
FIG. 10(B) is a view illustrating a test example where upper and lower surfaces of a vibrator each have 2 piezoelectric plates attached thereon and an angle between longitudinal axes of neighboring piezoelectric plates is 75° or 105°.

Experiments for testing a performance of the flat type piezoelectric ultrasonic motor according to a change of the angle θ are performed, and the test results are illustrated in FIGS. 10(A) and 10B.

In this experiments, upper and lower surfaces of a vibrator 10 each have two piezoelectric plates 15 attached thereon, and the respective two piezoelectric plates 15 are arranged in such a way that they have opposite polarization directions and the angel θ is 75° through 105°. Thereafter, alternating driving voltages, which are different from each other by 90° in their phase, are respectively applied to the neighboring piezoelectric plates 15 by the power source unit 20.

FIG. 10(A) illustrates a case where and the angel θ is 90°, and FIG. 10(B) illustrates a case where the angle θ is 75° or 105°.

Here, it can be easily understood by those skilled in the art that a case of θ=75° and a case of θ=105° have the same test result because the two cases have substantially the same arrangement structure.

Test software used in the above experiments is "ATILA" produced by American Magsoft Corporation, which is a FEA program used only for a piezoelectric device As known from the test results illustrated in FIGS. 10(A) and 10(B), four resonance modes are ascertained. For the respective resonance modes, a useful resonance frequency and an anti-resonance frequency are detected in the elliptical motion of the traveling wave generated by the vibrator 10 so as to rotate the rotor 5. Also, detected is an energy conversion efficiency (%) from an electrical energy applied to the piezoelectric plates 15 to a mechanical energy converted by the vibrator 10. Here, that such a energy conversion efficiency is high means that a rotation efficiency of the rotor 5 is high.

In a case of θ=90° illustrated in FIG. 10(A), the detected energy conversion efficiency is maintained highly and uniformly within a range of 9.43% to 15.39%, which is highly acceptable.

The detection results are shown in Table 1 below.

TABLE 1

| Test Mode | Resonance Frequency (Hz) | Anti-Resonance Frequency (Hz) | Energy Conversion Efficiency (%) |
| --- | --- | --- | --- |
| 1 Resonance | 88873.2 | 89345.4 | 10.27 |
| 2 Resonances | 158234.0 | 159394.0 | 12.04 |
| 3 Resonances | 250035.0 | 253048.0 | 15.39 |
| 4 Resonances | 279306.0 | 280556.0 | 9.43 |

In a case of θ=75° illustrated in FIG. 10(B), the detected energy conversion efficiency is rather lowly maintained within a range of 6.64% to 16.26%, which is so-so acceptable.

The detection results are shown in Table 2 below.

TABLE 2

| Test Mode | Resonance Frequency (Hz) | Anti-Resonance Frequency (Hz) | Energy Conversion Efficiency (%) |
|---|---|---|---|
| 1 Resonance | 90415.8 | 90718.2 | 8.16 |
| 2 Resonances | 168667.0 | 169643.0 | 10.71 |
| 3 Resonances | 260670.0 | 264186.0 | 16.26 |
| 4 Resonances | 288175.0 | 288812.0 | 6.64 |

However, the piezoelectric plates 15 were required to be additionally processed so as to maintain the θ at 75°, and it took considerable time and effort to accurately attach the additionally-processed plates 15 on the vibrator 10.

Accordingly, the maintenance of the θ below 75° is unsatisfactory and undesirable from the viewpoints of the energy conversion efficiency, miniaturization, simple structure and production of the flat type piezoelectric ultrasonic motor.

In the meantime, although it has been described that two and the other two of the piezoelectric plates 15 are respectively arranged on the upper and lower surfaces of the vibrator 10, the piezoelectric plates 15 can be arranged differently.

That is, all of the piezoelectric plates 15 can be arranged on one of the upper and lower surfaces of the vibrator 10, and such an arrangement makes it possible to reduce the thickness of the flat type piezoelectric ultrasonic motor and thereby to reduce the size of the motor.

Figure 10C:
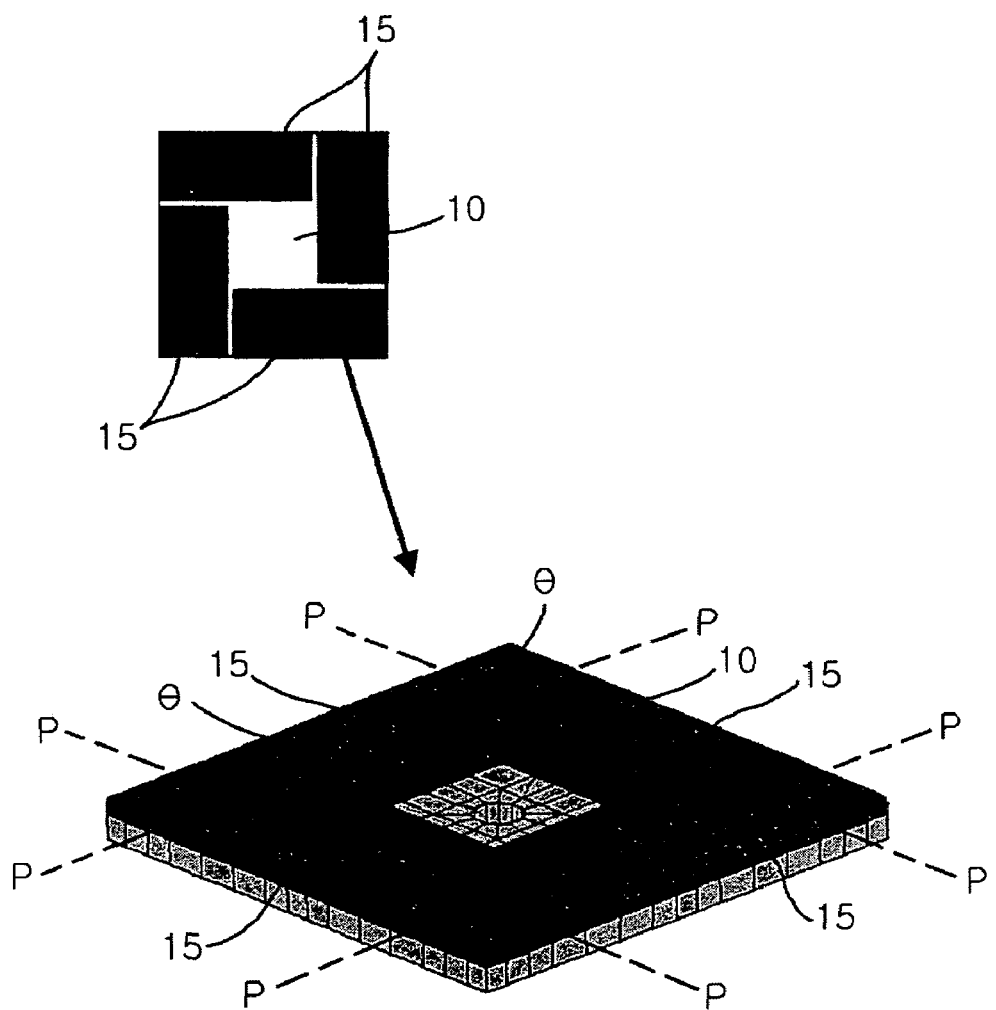
FIG. 10(C) is a view illustrating a test example where an upper surface of a vibrator has 4 piezoelectric plates attached thereon and an angle between longitudinal axes of neighboring piezoelectric plates is 90°.
Figure 10D:
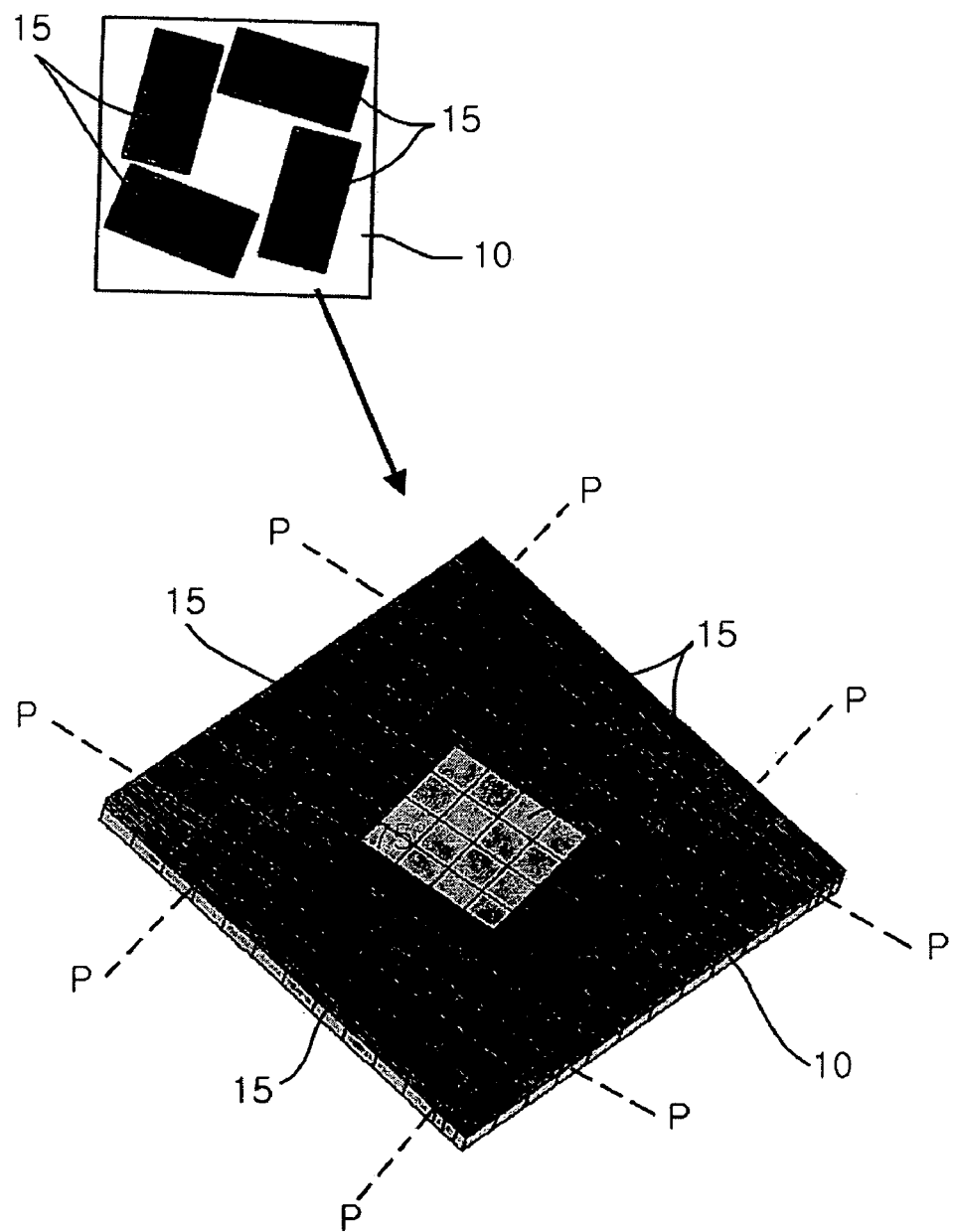
FIG. 10(D) is a view illustrating a test example where an upper surface of a vibrator has 4 piezoelectric plates attached thereon and an angle between longitudinal axes of neighboring piezoelectric plates is 75° or 105°.

Experiments for testing a performance of the flat type piezoelectric ultrasonic motor having the piezoelectric plates 15 attached on one of the upper and lower surfaces of the vibrator 10 are performed, and the test results are illustrated in FIGS. 10(C) and 10D.

In this experiments, all of the piezoelectric plates 15 are arranged on the upper or lower quartered surfaces of a vibrator 10 in such a way that longitudinal axes (P) of neighboring piezoelectric plates 15 form a given angle θ therebetween and opposing piezoelectric plates 15 have opposite polarization directions. Thereafter, alternating driving voltages, which are different from each other by 90° in their phase, are respectively applied to the neighboring piezoelectric plates 15 by the power source unit 20.

As known from the test results illustrated in FIGS. 10(C) and 10(D), ten resonance modes are ascertained.

FIG. 10(C) illustrates a case where the upper surface of a vibrator has 4 piezoelectric plates 15 attached thereon and the angel θ is 90°, and FIG. 10(D) illustrates a case where an upper surface of a vibrator has 4 piezoelectric plates 15 attached thereon and the angel θ is 75°.

In a case of θ=90° illustrated in FIG. 10(C), the detected energy conversion efficiency is maintained highly and uniformly within a range of 9.70% to 21.12%, which is highly acceptable.

The detection results are shown in Table 3 below.

TABLE 3

| Test Mode | Resonance Frequency (Hz) | Anti-Resonance Frequency (Hz) | Energy Conversion Efficiency (%) |
|---|---|---|---|
| 1 resonance | 82743.2 | 83177.3 | 10.20 |
| 2 resonances | 82766.5 | 83246.5 | 10.72 |
| 3 resonances | 152986.0 | 156084.0 | 19.82 |
| 4 resonances | 153152.0 | 156688.0 | 21.12 |
| 5 resonances | 240408.0 | 241548.0 | 9.70 |
| 6 resonances | 240484.0 | 241826.0 | 10.52 |
| 7 resonances | 286842.0 | 288539.0 | 10.83 |
| 8 resonances | 286948.0 | 288819.0 | 11.36 |
| 9 resonances | 300417.0 | 303598.0 | 14.44 |
| 10 resonances | 300459.0 | 304182.0 | 15.60 |

In a case of θ=75° illustrated in FIG. 10(D), the detected energy conversion efficiency is maintained rather low within a range of 5.61% to 19.43%, which is so-so acceptable.

The detection results are shown in Table 4 below.

TABLE 4

| Test Mode | Resonance Frequency (Hz) | Anti-Resonance Frequency (Hz) | Energy Conversion Efficiency (%) |
|---|---|---|---|
| 1 resonance | 84904.9 | 85334.0 | 10.02 |
| 2 resonances | 84918.1 | 85348.5 | 10.03 |
| 3 resonances | 167049.0 | 168943.0 | 14.93 |
| 4 resonances | 167228.0 | 169414.0 | 16.01 |
| 5 resonances | 261251.0 | 263741.0 | 13.71 |
| 6 resonances | 261469.0 | 264503.0 | 15.10 |
| 7 resonances | 296126.0 | 296631.0 | 5.83 |
| 8 resonances | 296244.0 | 296711.0 | 5.61 |
| 9 resonances | 318800.0 | 322559.0 | 15.22 |
| 10 resonances | 318832.0 | 325025.0 | 19.43 |

However, the piezoelectric plates 15 were required to be additionally processed so as to maintain the θ at 75° or 105°, and it took considerable time and effort to accurately attach the additionally-processed plates 15 on the vibrator 10. Accordingly, the maintenance of the θ below 75° is unsatisfactory and undesirable from the viewpoints of the energy conversion efficiency, miniaturization, simple structure and production of the flat type piezoelectric ultrasonic motor.

Accordingly, it is preferable that the angle θ in the piezoelectric ultrasonic motors 1 and 1' is 75° through 105°.

Also, it is more preferable that the angle θ in the piezoelectric ultrasonic motors 1 and 1' is 90°, from the viewpoints of the energy conversion efficiency of the motors and the production and assembly of the plates 15.

Figure 11A:
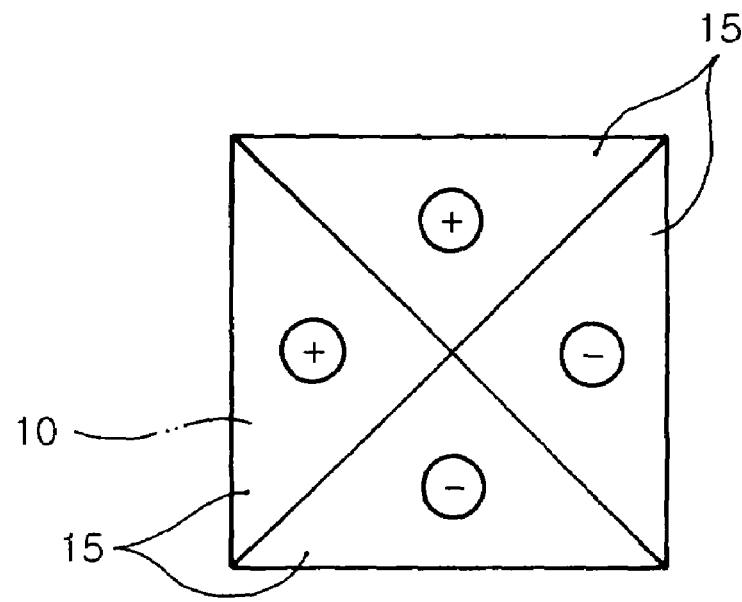
FIG. 11(A) is a view illustrating a structure where 4 piezoelectric plates are respectively arranged on 4 diagonally-quartered surface areas of a vibrator.
Figure 11B:
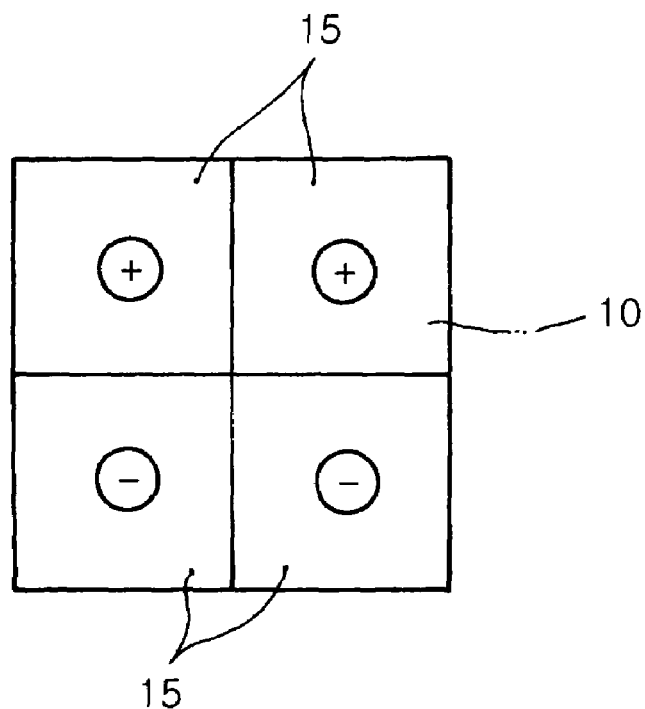
FIG. 11(B) is a view illustrating a structure where 4 piezoelectric plates are respectively arranged on 4 horizontally/vertically-quartered surface areas of a vibrator.

In the meantime, although it has been described that the piezoelectric plates 15 are arranged in a square-like shape, the piezoelectric plates 15 can be arranged in other shapes as shown in FIGS. 11(A) and 11(B).

FIG. 11 are exemplary views illustrating possible structures of a flat type piezoelectric ultrasonic motor according to the present invention.

FIG. 11(A) illustrates a structure where 4 piezoelectric plates are respectively arranged on 4 diagonally-quartered surface areas of the vibrator 15, and FIG. 11(B) illustrates a structure where 4 piezoelectric plates are respectively arranged on 4 horizontally/vertically-quartered surface areas of the vibrator 15.

Also in this structures, two and the other two of the piezoelectric plates 15 are respectively arranged on the upper and lower surfaces of the vibrator 10, or all of the piezoelectric plates 15 can be arranged one of the upper and lower surfaces of the vibrator 10. In all cases, the opposing piezoelectric plates 15 have opposite polarization directions (See "+" and "−" signs in FIGS. 11(A) and 11B) and alternating driving voltages, which are different from each other by 90° in their phase, are respectively applied to the neighboring piezoelectric plates 15 by the power source unit 20.

As described previously, the flat type piezoelectric ultrasonic motor according to the present invention is equipped with a rotor, a vibrator and piezoelectric plates respectively arranged on quartered surface areas of the vibrator, and driven in such a way that the rotor is rotated by the vibrator vibrated by different-phased alternating voltages applied to the piezoelectric plates, thereby making it possible to efficiently drive the rotor, minimize its size and enhance its driving efficiency.

Also, the flat type piezoelectric ultrasonic motor makes it possible to facilitate its production and assembly, thereby enabling its mass production.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A flat type piezoelectric ultrasonic motor for generating a rotation force to a rotor by ultrasonic vibrations, the motor comprising:
   a vibrator formed of elastic material;
   a plurality of piezoelectric plates attached on the vibrator, each piezoelectric plate having an electrode surface to form an electrode;
   a rotor drivingly connected to the vibrator to be rotated thereby; and
   a power source unit for applying driving voltages to the piezoelectric plates,
   wherein the piezoelectric plates are arranged on quartered surface areas of the vibrator in such a way that longitudinal axes of neighboring piezoelectric plates form a given angle therebetween and opposing piezoelectric plates have opposite polarizations;
   the electrode surface of the piezoelectric plates being normal to a rotation axis of the rotor; and
   the power source unit configured to apply alternating driving voltages to the piezoelectric plates to thereby rotate the rotor.

2. The motor of claim 1, wherein one half and the other half of the piezoelectric plates are respectively attached on upper and lower surfaces of the vibrator.

3. The motor of claim 1, wherein all of the piezoelectric plates are attached on one of upper and lower surfaces of the vibrator.

4. The motor of claim 1, wherein the alternating driving voltages are different from each other in their phase by 90°.

5. The motor of claim 1, wherein the given angle is in the range of 75° to 105°.

6. The motor of claim 5, wherein the given angle is 90°.

7. The motor of claim 1, wherein the vibrator has a plurality of legs for connecting the vibrator to the rotor.

8. The motor of claim 1, wherein the vibrator has a center hole penetrated by a rotation axis attached vertically to a base and the rotor is rotatably supported by a top end of the rotation axis.

9. The motor of claim 1, wherein the vibrator comprises terminals formed of conductive material, for supplying power sources to electrodes of the piezoelectric plates.

10. A flat type piezoelectric ultrasonic motor for generating a rotation force to a rotor by ultrasonic vibrations, the motor comprising:
    a vibrator formed of elastic material;
    a plurality of piezoelectric plates attached on the vibrator, each piezoelectric plate having an electrode surface to form an electrode;
    a rotor drivingly connected to the vibrator to be rotated thereby;
    a preloader for bringing the rotor into contact with the vibrator; and
    a power source unit for applying driving voltages to the piezoelectric plates,
    wherein the piezoelectric plates are arranged on quartered surface areas of the vibrator in such a way that longitudinal axes of neighboring piezoelectric plates form a given angle therebetween and opposing piezoelectric plates have opposite polarizations;
    the electrode surface of the piezoelectric plates being normal to a rotation axis of the rotor; and
    the power source unit configured to apply alternating driving voltages to the piezoelectric plates to thereby rotate the rotor.

11. The motor of claim 10, wherein one half and the other half of the piezoelectric plates are respectively attached on upper and lower surfaces of the vibrator.

12. The motor of claim 10, wherein all of the piezoelectric plates are attached on one of upper and lower surfaces of the vibrator.

13. The motor of claim 10, wherein the preloader is a leaf spring.

14. The motor of claim 10, wherein the preloader is a coil spring.

15. The motor of claim 10, wherein the alternating driving voltages are different from each other in their phase by 90°.

16. The motor of claim 10, wherein the given angle is in the range of 75° to 105°.

17. The motor of claim 16, wherein the given angle is 90°.

18. The motor of claim 10, wherein the vibrator has a plurality of legs for connecting the vibrator to the rotor.

19. The motor of claim 10, wherein the vibrator has a center hole penetrated by a rotation axis attached vertically to a base and the rotor is rotatably supported by a top end of the rotation axis.

20. The motor of claim 10, wherein the vibrator comprises terminals formed of conductive material, for supplying power sources to electrodes of the piezoelectric plates.

* * * * *